US012572694B2

(12) United States Patent
Zhang et al.

(10) Patent No.: US 12,572,694 B2
(45) Date of Patent: Mar. 10, 2026

(54) DATA PROCESSING METHOD AND APPARATUS, ELECTRONIC DEVICE, AND STORAGE MEDIUM

(71) Applicant: CHINA UNIONPAY CO., LTD., Shanghai (CN)

(72) Inventors: Yuanjian Zhang, Shanghai (CN); Yongkai Zhou, Shanghai (CN); Zhongzheng Chen, Shanghai (CN)

(73) Assignee: China Unionpay Co., Ltd., Shanghai (CN)

( * ) Notice: Subject to any disclaimer, the term of this patent is extended or adjusted under 35 U.S.C. 154(b) by 0 days.

(21) Appl. No.: 19/104,157

(22) PCT Filed: Jan. 10, 2023

(86) PCT No.: PCT/CN2023/071564
§ 371 (c)(1),
(2) Date: Feb. 14, 2025

(87) PCT Pub. No.: WO2024/036880
PCT Pub. Date: Feb. 22, 2024

(65) Prior Publication Data
US 2025/0258959 A1 Aug. 14, 2025

(30) Foreign Application Priority Data
Aug. 15, 2022 (CN) .......................... 202210975564.1

(51) Int. Cl.
*G06F 21/62* (2013.01)
(52) U.S. Cl.
CPC ................................ *G06F 21/6245* (2013.01)
(58) Field of Classification Search
None
See application file for complete search history.

(56) References Cited

U.S. PATENT DOCUMENTS

2020/0143080 A1 5/2020 Wang et al.
2020/0210888 A1* 7/2020 Eldardiry ............... G06N 5/048
(Continued)

FOREIGN PATENT DOCUMENTS

CN 111435452 A 7/2020
CN 112347476 A 2/2021
(Continued)

OTHER PUBLICATIONS

International Search Report for corresponding PCT/CN2023/071564 dated Apr. 18, 2023.
(Continued)

*Primary Examiner* — Alexander Lagor
*Assistant Examiner* — Felicia Farrow
(74) *Attorney, Agent, or Firm* — K&L Gates LLP

(57) ABSTRACT

A data processing method and apparatus, an electronic device, and a storage medium acquire label residual values determined for respective data samples, each label residual value being used for representing a degree of deviation between a real label of a corresponding data sample and a label predicted by a target model; perform residual decomposition on the respective data samples based on respective label residual values to obtain model parameter correction amounts corresponding to the respective data samples; and send the model parameter correction amounts to a data receiver. The data receiver reconstructs model parameter information of the target model based on the model parameter correction amounts. Perturbing residuals through residual decomposition enables a data sender to protect the real labels owned thereby, while the data sender can send necessary correction information to the data receiver to reconstruct accurate model parameter information to ensure the model training performance.

6 Claims, 8 Drawing Sheets

(56) References Cited

U.S. PATENT DOCUMENTS

| | | | |
|---|---|---|---|
| 2024/0005210 A1 | 1/2024 | Sun et al. | |
| 2024/0025689 A1 | 1/2024 | Asano et al. | |

FOREIGN PATENT DOCUMENTS

| | | | | |
|---|---|---|---|---|
| CN | 114611128 A | * | 6/2022 | ............... H04L 9/00 |
| CN | 114723068 A | | 7/2022 | |
| CN | 115422574 A | | 12/2022 | |
| WO | 2024036880 A1 | | 2/2024 | |

OTHER PUBLICATIONS

Written Opinion for corresponding PCT/CN2023/071564 dated Apr. 18, 2023; English Translation included.

* cited by examiner

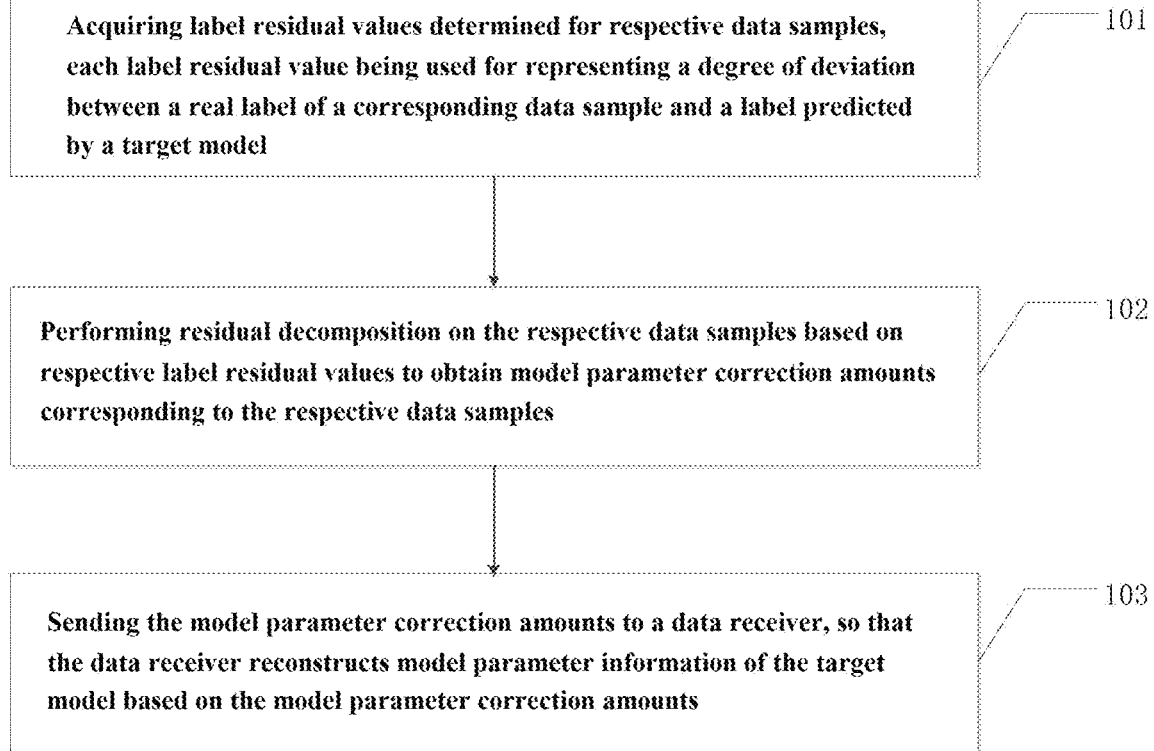

Acquiring label residual values determined for respective data samples, each label residual value being used for representing a degree of deviation between a real label of a corresponding data sample and a label predicted by a target model — 101

Performing residual decomposition on the respective data samples based on respective label residual values to obtain model parameter correction amounts corresponding to the respective data samples — 102

Sending the model parameter correction amounts to a data receiver, so that the data receiver reconstructs model parameter information of the target model based on the model parameter correction amounts — 103

FIG. 1

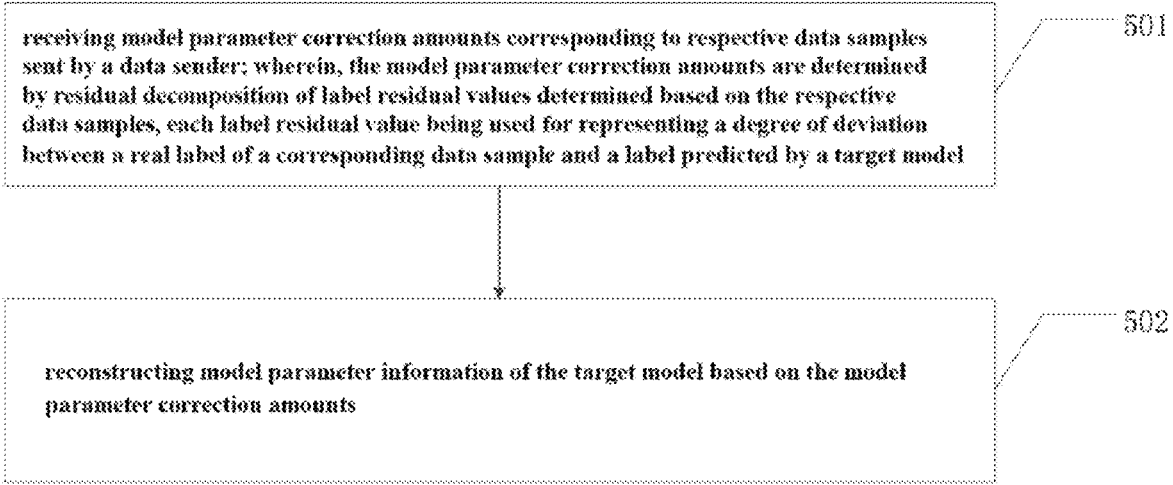

receiving model parameter correction amounts corresponding to respective data samples sent by a data sender; wherein, the model parameter correction amounts are determined by residual decomposition of label residual values determined based on the respective data samples, each label residual value being used for representing a degree of deviation between a real label of a corresponding data sample and a label predicted by a target model — 501 reconstructing model parameter information of the target model based on the model parameter correction amounts — 502

FIG. 5

DATA PROCESSING METHOD AND APPARATUS, ELECTRONIC DEVICE, AND STORAGE MEDIUM

CROSS-REFERENCE TO RELATED APPLICATIONS

This application is a U.S. National Stage Entry under 35 U.S.C. § 371 of International Patent Application No. PCT/CN2023/071564, entitled "DATA PROCESSING METHOD AND APPARATUS, ELECTRONIC DEVICE, AND STORAGE MEDIUM," filed Jan. 10, 2023, which claims benefit of Chinese patent application filed on Aug. 15, 2022, with application number of CN202210975564.1 and title of "Data Processing Method and Apparatus, Electronic Device, and Storage Medium". The entire disclosures of which are hereby incorporated by reference herein.

TECHNICAL FIELD

The present application relates to the technical field of data security, and specifically to a data processing method and apparatus, an electronic device, and a storage medium.

BACKGROUND

With the development of application fields such as artificial intelligence and big data mining and analysis, the demand for data volume is ever increasing. To achieve mining of greater value, it is often necessary to integrate data from multiple parties. The multi-party data here may come from different organizations, for example, transaction data may be scattered across financial institutions, and medical diagnosis records may come from medical institutions. In addition, the multi-party data may also come from different industries, for example, transaction data may either come from e-commerce or finance.

Multi-party data elements are subject to regulatory compliance constraints during the process of circulation, making the approach of centrally collecting detailed data for model training for business operations unfeasible, which constitutes a data barrier. To break down the data barrier, the approach of Federated learning may be used to enable all parties involved to obtain a global model without the need to share their private data, where the private data here may be label information about the target user, such as whether the target user is a high net worth user. While reasonably mining the application value of data, it is also necessary to prevent data abuse and protect privacy data. In practical applications, model related information may be exchanged through encryption to achieve collaborative optimization of the Federated model.

A residual encryption method is provided in related technologies. Taking label data as privacy data as an example, the labeled party may make a differential privacy in the form of addition before sending the model related information, so that after the differential privacy conditions are reached, the labeled party may send it to the unlabeled party in the form of homomorphic encryption. Due to the presence of noise, the unlabeled party is unable to reconstruct the true residuals based on the model related parameters grasped, thus achieving the goal of privacy data protection.

However, due to the inherent noise in differential privacy, there is certain performance loss in model accuracy for the unlabeled party in the future.

SUMMARY

The embodiments of the present application provide at least a data processing method and apparatus, an electronic device, and a storage medium. The data sender encrypts the label, which is private data, by means of residual decomposition, and the data receiver reconstructs the model parameters based on the model parameter correction amounts obtained through encryption, resulting in a reconstructed model with relatively high accuracy.

According to a first aspect, an embodiment of the present application provides a data processing method, comprising:

acquiring label residual values determined for respective data samples, each label residual value being used for representing a degree of deviation between a real label of a corresponding data sample and a label predicted by a target model;

performing residual decomposition on the respective data samples based on respective label residual values to obtain model parameter correction amounts corresponding to the respective data samples; and sending the model parameter correction amounts to a data receiver, so that the data receiver reconstructs model parameter information of the target model based on the model parameter correction amounts.

In a possible embodiment, performing residual decomposition on the respective data samples based on the respective label residual values to obtain model parameter correction amounts corresponding to the respective data samples, comprises:

ordering the respective label residual values in an order of data size to obtain respective ordered label residual values;

changing the ordered label residual values where the target data sample is based on the condition that a target data sample that requires residual decomposition is selected from the respective data samples, to obtain residual change information corresponding to the respective data samples; and determining model parameter correction amounts corresponding to the respective data samples based on the residual change information corresponding to the respective data samples and the real labels of the respective data samples.

In a possible embodiment, the target data sample that requires residual decomposition is selected from the respective data samples according to the following steps:

grouping the respective ordered label residual values according to a preset number of groups to obtain grouped label residual values;

selecting a preset number of target label residual values from each grouped label residual values; and determining a data sample corresponding to the target label residual values as the target data sample.

In a possible embodiment, changing the ordered label residual values where the target data sample is based on the condition that the residual change information corresponding to the respective data samples corresponds to a residual change vector, to obtain the residual change information corresponding to the respective data samples, comprises:

for each of the data samples, on the condition that it is judged that the data sample is not the target data sample, determining that the data sample corresponds to a first residual change value;

or, on the condition that it is judged that the data sample is the target data sample and the label residual value of the data sample is greater than zero, determining that the data sample corresponds to a second residual change value; or, on the condition that it is judged that the data sample is the target data sample and the label residual value of the data sample is less than zero, determining that the data sample corresponds to a third residual change value; and collecting residual change values respectively corresponding to the respective data samples to determine the residual change vector; wherein, the residual change vector is used to represent whether the label residual values of the respective data samples have changed.

In a possible embodiment, determining model parameter correction amounts corresponding to the respective data samples based on the residual change information corresponding to the respective data samples and the real labels of the respective data samples, comprises:

performing point multiplication operation on the residual change vector and a transpose result of the residual change vector to determine a first operator; and, determining a second operator corresponding to the label values on the condition that the label values corresponding to the real labels of the respective data samples are determined; and determining the model parameter correction amounts corresponding to the respective data samples based on the first operator and the second operator.

In a possible embodiment, after obtaining the residual change information corresponding to the respective data samples, the method further comprises:

determining changed label residual values based on the residual change information corresponding to the respective data samples and product operation between the respective ordered label residual values;

determining the model parameter information to be sent to the data receiver based on the changed label residual values; and sending the model parameter information to the data receiver.

In a possible embodiment, sending the model parameter information to the data receiver comprises:

sending the model parameter information to the data receiver on the condition that model convergence conditions are not reached, sending the model parameter correction amounts to the data receiver comprises:

sending the model parameter correction amounts to the data receiver on the condition that the model convergence conditions are reached.

According to a second aspect, the present application also provides a data processing method, comprising:

receiving model parameter correction amounts corresponding to respective data samples sent by a data sender; wherein, the model parameter correction amounts are determined by means of residual decomposition based on label residual values determined for the respective data samples, each label residual value being used for representing a degree of deviation between a real label of a corresponding data sample and a label predicted by a target model; and reconstructing model parameter information of the target model based on the model parameter correction amounts.

In a possible embodiment, reconstructing the model parameter information of the target model based on the model parameter correction amounts comprises:

acquiring data characteristic information input for the target model; and determining the model parameter information of the target model based on the data characteristic information and the model parameter correction amounts.

In a possible embodiment, on the condition that the data characteristic information includes a data characteristic vector, determining the model parameter information of the target model based on the data characteristic information and the model parameter correction amounts comprises:

performing point multiplication operation on the data characteristic vector and a transpose result of the data characteristic vector to determine a third operator; and, performing point multiplication operation on the transpose result of the data characteristic vector and the data characteristic vector to determine a fourth operator; and determining the model parameter information of the target model based on the third operator, the fourth operator, and the model parameter correction amounts.

According to a third aspect, the present application also provides a data processing apparatus, comprising:

an acquisition module, for acquiring label residual values determined for respective data samples, each label residual value being used for representing a degree of deviation between a real label of a corresponding data sample and a label predicted by a target model;

a decomposition module, for performing residual decomposition on the respective data samples based on the respective label residual values to obtain model parameter correction amounts corresponding to the respective data samples; and a sending module, for sending the model parameter correction amounts to a data receiver, so that the data receiver reconstructs model parameter information of the target model based on the model parameter correction amounts.

According to a fourth aspect, the present application also provides a data processing apparatus, comprising:

a receiving module, for receiving model parameter correction amounts corresponding to respective data samples sent by a data sender; wherein, the model parameter correction amounts are determined by means of residual decomposition based on label residual values determined for the respective data samples, each label residual value being used for representing a degree of deviation between a real label of a corresponding data sample and a label predicted by a target model; and a reconstruction module, for reconstructing model parameter information of the target model based on the model parameter correction amounts.

According to a fifth aspect, the present application also provides an electronic device, comprising: a processor, a memory, and a bus, the memory stores machine-readable instructions executable by the processor, when the electronic device is running, the processor and the memory communicate with each other through the bus, and when the machine-readable instructions are executed by the processor, the data processing method according to any of the first aspect and its various embodiments, and the second aspect and its various embodiments is executed.

According to a sixth aspect, the present application also provides a computer-readable storage medium with a computer program stored thereon, when the computer program is run by a processor, the data processing method according to any of the first aspect and its various embodiments, and the second aspect and its various embodiments is executed.

By using the above data processing method and apparatus, electronic device, and storage medium, on the condition that label residual values determined for the respective data samples are obtained, residual decomposition can be performed on the respective data samples based on the respective label residual values. Then, the model parameter correction amounts corresponding to the respective data samples obtained by means of residual decomposition can be sent to a data receiver, and the data receiver can reconstruct the model parameter information based on the model parameter correction amounts. In the present application, the data sender (i.e., the labeled party) can effectively perturb the residuals during the residual decomposition process, so that the data receiver (i.e., the unlabeled party) can only construct a model with erroneous label information. This enables the data sender to protect the real labels owned thereby, and at the same time, the labeled party can transmit necessary correction information (i.e., model parameter correction amounts) to the unlabeled party, allowing the unlabeled party to reconstruct accurate model parameter information based on the correction information so as to ensure the model training performance.

Other advantages of the present application will be described in further detail in conjunction with the following description and accompanying drawings.

It should be appreciated that the above description is only a summary of the technical solution of the present application in order to provide a clearer understanding of the technical means of the present application, so that the technical solution can be implemented according to the content of the specification. In order to make the above and other purposes, features, and advantages of the present application more clear and understandable, the following examples are specifically provided to illustrate the specific embodiments of the present application.

BRIEF DESCRIPTION OF THE DRAWINGS

In order to describe the technical solution of the embodiments of the present application more clearly, the accompanying drawings required for use in the embodiments will be introduced briefly. The accompanying drawings are incorporated into the specification and form a part of it. These accompanying drawings illustrate embodiments that comply with the present application and are used together with the specification to explain the technical solution of the present application. It should be appreciated that the following accompanying drawings only illustrate certain embodiments of the present application and therefore should not be considered as limiting the scope. For those skilled in the art, other relevant accompanying drawings may be obtained based on these accompanying drawings without creative labor. In addition, throughout the accompanying drawings, the same reference numerals are used to denote the same components. In the accompanying drawings:

FIG. 1 shows a flowchart of a data processing method provided by an embodiment of the present application;

FIG. 5 shows a flowchart of another data processing method provided by an embodiment of the present application;

DETAILED DESCRIPTION

Figure 2:
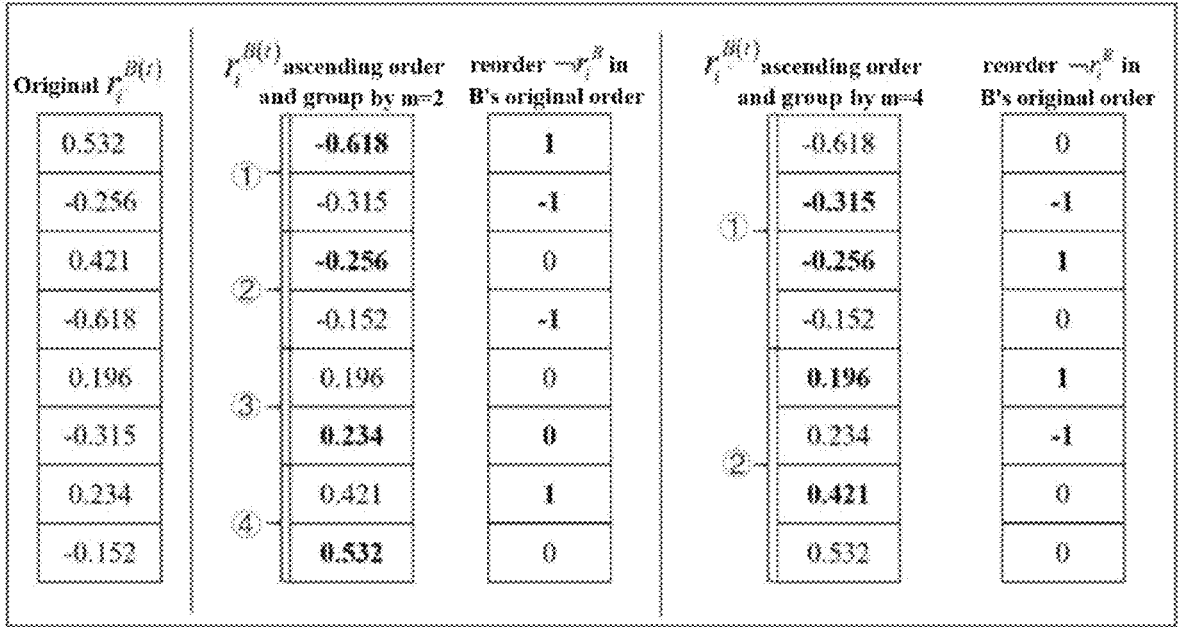
FIG. 2 shows a flowchart of a specific method for determining residual change information in a data processing method provided by an embodiment of the present application.

The exemplary embodiments of the present application will be described in further detail below with reference to the accompanying drawings. Although the exemplary embodiments of the present application are shown in the accompanying drawings, it should be appreciated, however, that the present application may be implemented in various forms and should not be limited by the embodiments described herein. On the contrary, these embodiments are provided here to enable a more thorough understanding of the present application and to fully convey the scope of the present application to those skilled in the art.

In the description of the embodiments of the present application, it should be appreciated that terms such as "include" or "have" are intended to indicate the existence of the features, numbers, steps, actions, components, parts, or combinations thereof disclosed in this specification, and are not intended to exclude the possibility of the existence of one or more other features, numbers, steps, actions, components, parts, or combinations thereof.

Unless otherwise specified, "/" means "or", for example, A/B may represent A or B. "And/or" herein is only a description of the association relationship between associated objects, indicating that there may be three types of relationships, for example, A and/or B may represent: A exists alone, A and B exist simultaneously, and B exists alone.

The terms "first", "second", etc. are only used for descriptive purposes, and cannot be understood as indicating or implying relative importance or implying or indicating the number of technical features indicated. Therefore, features limited by "first" and "second" may explicitly or implicitly include one or more of the features. In the description of the embodiments of the present application, unless otherwise specified, "a plurality of" means two or more.

It has been found upon research that in related technologies, model related information may be exchanged by means of encryption to achieve collaborative optimization of a Federated model.

A residual encryption method is provided in related technologies. Taking labeled data as privacy data as an example, the labeled party may make a differential privacy in the form of addition before sending model related information, so that after the differential privacy conditions are reached, the labeled party may send it to the unlabeled party in the form of homomorphic encryption.

Wherein, in the process of performing differential privacy, that is, adding noise to the residual $r_i$ to make the differential privacy to be: $\tilde{r}_i = r_i + \text{noise}$, wherein the added noise satisfies the condition $\text{noise} \sim \text{Lap}(2\varepsilon^{-1})$ (i.e., the noise comes from the Laplace random variable generated by the standard deviation of $2\varepsilon^{-1}$). Due to the presence of noise, the unlabeled party is unable to reconstruct the real residual $r_i$ based on the model related parameters grasped, thus achieving the goal of protecting privacy data.

Another encryption method is localized differential privacy random response. The idea is to randomly perturb the composition of a batch, so that the dimensions of interaction residuals remain unchanged in terms of form, but the actual rank is less than the number of samples in the batch, resulting in residuals being not unique.

Specifically, the labeled party selects a subset C from the samples of the labeled party based on the batch size agreed by both parties, generates a random response vector m about the label $y \in \{0,1\}$ using category distribution of the labels, and sends $m_{rr}$ obtained by differential privacy processing to the unlabeled party. When the unlabeled party constructs a local model based on the feature $x^b$, the labeled party gives the real residual value $r_i$ of the residual $m_i=1$ obtained from the random response, while setting 0 for samples that are not in the batch. While ensuring that the residual dimension of the interaction is still the size of the batch (|B|), the constructed residual matrix is sent to the unlabeled party after homomorphic encryption. The formal representation of the composition of the sent content D is:

$$\langle r_i \rangle = \begin{cases} \langle \sigma(l_i) \rangle & i \in D \\ 0 & i \notin D \end{cases}$$

wherein, $D \subset \{i:m_i=1\}^\wedge|D|=|B|$, $\sigma(\bullet)$ is the sigmoid function, and $\langle \bullet \rangle$ is homomorphic encryption. This method is called a label protection strategy mixing differential privacy with homomorphic encryption, and can achieve & differential privacy under the following conditions:

$$\frac{q\exp(\varepsilon)}{1+\exp(\varepsilon)} + \frac{1-q}{1+\exp(\varepsilon)} < 1, 0 < q < \frac{1}{2}$$

q is the proportion marked as 1 in m. By the above operations by the labeled party, the unlabeled party is unable to construct a linear equation set about the residuals.

However, although the above method achieves label protection and reduces the accuracy loss of classification compared to the first encryption method, it does not fully utilize the sample information in the batch due to the existence of differential privacy and random zero setting. Therefore, there is still a performance loss compared to plaintext computation, and the reduction of accuracy loss of classification is at the cost of increasing training costs, which is not likely to be put into production use in the short term.

In order to at least partially address one or more of the aforementioned issues and other potential problems, the present application provides at least a data processing solution. The labeled party encrypts the label, which is private data, by means of residual decomposition, while the unlabeled party performs model parameter reconstruction based on the model parameter correction amounts obtained through encryption, resulting in a reconstructed model with relatively high accuracy.

It should be noted that both labeled and unlabeled parties in the embodiments of the present application require local computation, and correct information in a collaborative and interactive manner, with no significant increase in computational costs. The labeled party here corresponds to the data sender, the unlabeled party corresponds to the data receiver, residual decomposition is performed on the side of the labeled party, and parameter reconstruction is completed on the side of the unlabeled party.

In practical applications, the data sender here refers to the initiator with real labels and its processing equipment used to perform operations including residual decomposition, and the data receiver here refers to the responder with model input features but without real labels and its processing equipment used to perform parameter reconstruction operations.

In order to facilitate the understanding of the embodiments, a data processing method disclosed in embodiments of the present application will first be described in detail. The executing subject of the data processing method provided in embodiments of the present application is generally an electronic device with certain computing power. The electronic device includes, for example, terminal devices or other processing devices. The terminal devices may be user equipment (UE), mobile devices, user terminals, cellular phones, personal digital assistants (PDA), handheld devices, and the like. In some possible embodiments, the data processing method may be implemented by the processor calling computer-readable instructions stored in the memory.

As shown in FIG. 1, it is a flowchart of a data processing method provided by an embodiment of the present application. The method is mainly executed by the data sender, and specifically includes steps S101-S103, wherein:

S101: acquiring label residual values determined for respective data samples, each label residual value being used for representing a degree of deviation between a real label of a corresponding data sample and a label predicted by a target model;

S102: performing residual decomposition on the respective data samples based on respective label residual values to obtain model parameter correction amounts corresponding to the respective data samples; and S103: sending the model parameter correction amounts to a data receiver, so that the data receiver reconstructs model parameter information of the target model based on the model parameter correction amounts.

In order to facilitate the understanding of the data processing method provided by the embodiments of the present application, the application scenarios of the method will first be described in detail. The data processing method in the embodiments of the present application may mainly be applied to the field of Federated learning, where Federated learning here may correspond to a fusion learning approach of data from multiple parties, for example, it may be the fusion data formed from transaction data from financial institutions and medical diagnosis records from medical institutions.

In related technologies, the vertical logistic regression method is mostly used to construct joint models. However, due to the inherent characteristic constraints of the vertical logistic regression method, the private data of one party is likely to be inferred by the other party. For example, the label data generated within financial institutions regarding whether a user is a high net worth user is likely to leak to medical institutions with the sharing of model parameter information, which will bring certain insecurity factors to user privacy.

In order to enhance the protection of privacy data while better promoting Federated learning, the embodiments of the present application provide a collaborative data processing scheme, which mainly corresponds to two phases, namely, model training phase and model correction phase.

For the model training phase, it is mainly the process of performing residual decomposition by the labeled party. After decomposition, only a portion of the residual related information is exchanged with the unlabeled party under homomorphic encryption protection, while another portion of the residual retention information is held by the labeled party and does not participate in the model training process. As such, even if the unlabeled party solves the residuals according to the relevant label leakage attack approach (satisfying the column full rank condition), as the residuals no longer have a one-to-one correspondence with the real labels, the accuracy in inferring the labels of the labeled party by the unlabeled party is almost the same as that of random guessing binary classification results. Therefore, it is impossible to infer the real labels of the labeled party based on the sign of the residual obtained by known label leakage attack method, thus ensuring the security of privacy data.

For the model correction phase, it is mainly the process of reconstructing parameters by the unlabeled party. After the convergence of model training by the labeled party, initiated by the labeled party and responded by the unlabeled party, only an additional round of interaction between the labeled party and the unlabeled party about the weight information of the unlabeled party is needed to complete the correction of each characteristic weight of the unlabeled party. Due to the fact that the additional information provided by the labeled party cannot be obtained during the model training phase, and this information is the entirety of residual retention implemented by the real label and the protected label, the unlabeled party cannot obtain the label information of the labeled party during the model correction phase even though the unlabeled party reconstructs the model with high accuracy, thereby further ensuring the security of private data.

In an embodiment of the present application, the data sender, upon acquiring the label residual values determined for the respective data samples, may perform residual decomposition on the respective data samples based on the respective label residual values to obtain the model parameter correction amounts corresponding to the respective data samples, and finally send the model parameter correction amounts to the data receiver. The model parameter correction amounts here refer to the additional information provided by the labeled party to the unlabeled party, where the additional information is determined after decomposing the residuals.

The labeled party randomly performs residual decomposition locally based on the fitting degree of the unlabeled party to its own labels, in order to achieve the effect of randomly replacing label information, so that the unlabeled party cannot infer the real labels based on the residual information processed by the labeled party.

It can be seen that in the embodiments of the present application, by perturbing the residuals, the unlabeled party can only construct the model with erroneous label information, and the contained erroneous information is generated by the labeled party's local decomposition of the residual information, which the unlabeled party cannot distinguish. Then, the labeled party transmits necessary correction information to the unlabeled party, so that the unlabeled party can correct the weights of the characteristics, but cannot obtain the labels of the labeled party.

The unlabeled party corrects the biased characteristic weights with the cooperation of the labeled party to obtain the correct model parameter information. Due to the fact that this information includes the labels of the labeled party and the perturbation information on the labels, where the perturbation information is independent of the information known to the unlabeled party during the model training phase, the unlabeled party cannot obtain the label information of the labeled party.

Considering the crucial role of determining the model parameter correction amounts in the reconstruction of model parameters by the unlabeled party, the process of determining the model parameter correction amounts may be emphasized, which may be achieved through the following steps:

Step 1: ordering the respective label residual values in an order of data size to obtain respective ordered label residual values;

Step 2: changing the ordered label residual values where the target data sample is [in] based on the condition that a target data sample that requires residual decomposition is selected from the respective data samples, to obtain residual change information corresponding to the respective data samples; and Step 3: determining model parameter correction amounts corresponding to the respective data samples based on the residual change information corresponding to the respective data samples and the real labels of the respective data samples.

Here, the respective label residual values may first be ordered and the residual change information may be obtained, and then the model parameter correction amounts may be determined based on the residual change information and the real labels.

Wherein, the above residual change information is used to indicate whether the label residual values have changed. The changed label residual values may be marked with a first label, and the unchanged label residual values may be marked with a second label, so as to achieve the purpose of randomly replacing the real labels. Also considering that the model parameter correction amounts are obtained by combining the residual change information and the real labels, that is, what the unlabeled party obtains are not the direct real labels but the correction amounts after label mapping. Based on the correction amounts and the corresponding input features, the model parameter information may be constructed.

It should be noted that the labeled party only needs to map the real labels and the made labels locally for computation and synthesis after the model converges, and then send to the unlabeled party.

In order to achieve the purpose of randomly replacing real labels, it is necessary to select the target sample through a series of operations such as grouping and selection before performing residual changes. Specifically, the respective ordered label residual values may first be grouped according to a preset number of groups to obtain the grouped label residual values. Then, a preset number of target label residual values may be selected from each grouped label residual values, and finally, the data sample corresponding to the target label residual values is determined as the target data sample. The grouping here may be preset, for example, may be divided into two groups, four groups, etc., where no specific restrictions is made in this regard, with the purpose of preventing the unlabeled party from obtaining additional information about the label information of the labeled party based on the similarity between characteristics. At the same time, in the process of selecting data samples that require residual change from the respective groups, random quantitative extraction may be used to ensure the randomness of label replacement, thus further enhancing data security.

The residual change information in embodiments of the present application may refer to the residual change vector, each vector corresponding to the residual change situation of a data sample. Wherein, on the condition that it is judged that a data sample is not the target data sample, it may be determined that the data sample corresponds to a first residual change value; on the condition that it is judged that a data sample is the target data sample and the label residual value of the data sample is greater than zero, it may be determined that the data sample corresponds to a second residual change value; on the condition that it is judged that a data sample is the target data sample and the label residual value of the data sample is less than zero, it may be determined that the data sample corresponds to a third residual change value. Then, the residual change values corresponding to the respective data samples may be collected to determine the residual change vector.

Based on the residual change vector mentioned above, the model parameter correction amounts may be determined by the following steps:

Step 1: performing point multiplication operation on the residual change vector and a transpose result of the residual change vector to determine a first operator; and, determining a second operator corresponding to the label values on the condition that the label values corresponding to the real labels of the respective data samples are determined; and Step 2: determining the model parameter correction amounts corresponding to the respective data samples based on the first operator and the second operator.

Here, the model parameter correction amounts may be determined based on the first operator and the second operator. The model parameter correction amounts may also be a multi-dimensional vector, where each dimension points to the correction amount of a data sample, thereby achieving overall correction for the target model.

In the process of determining the residual change information, the product operation between the residual change information corresponding to the respective data samples and the respective ordered label residual values may also be used to determine the changed label residual values. Then, the model parameter information to be sent to the data receiver may be determined based on the changed label residual values, and the model parameter information may be sent to the data receiver.

Wherein, the computation process regarding the changed label residual values mentioned above may be a step that only needs to be executed once before the model converges. For example, the labeled party may perform the above step in the first round to change the residual values of the randomly selected samples, the effect of which is equivalent to changing the real label of the sample. On the premise of ensuring label security, it also reduces the computational cost.

It should be noted that the model parameter information here may be sent from the labeled party to the unlabeled party during the intermediate training process, that is, before reaching the model convergence conditions. Due to residual changes, even if the unlabeled party receives the model parameter information, it cannot infer the real label. After completing the model training, that is, when the model convergence conditions are reached, the labeled party may send the correction amounts to the unlabeled party to facilitate the reconstruction of accurate model parameter information by the unlabeled party.

In practical applications, model convergence may be associated with the training batch. When all data samples in a batch have completed one round of parameter updates, it may be determined whether the model reaches the convergence conditions. If it converges, the correction amounts are sent in the above way. Otherwise, the model training continues.

To facilitate the understanding of the process of determining the model parameter correction amounts mentioned above, further explanation may be provided in conjunction with the following embodiments.

Firstly, an example of the prerequisite is as follows:

1) Modeling needs to be completed between two parties, with Party A assuming the role of data application party (Guest), and Party B assuming the roles of data provider (Host) and collaborator (Arbiter). The label is on the side of Party A (i.e., labeled party), and the characteristic is on the side of Party B (i.e., unlabeled party);

2) The label of Party A is binary classification (0/1);

3) Party B only knows that Party A's label is in the form of binary classification 0/1, and other information about Party A's label is unknown to Party B, but the labels of either category are of interest to Party B (i.e., Party B wants to know the label information of any sample of Party A);

4) Both parties agree to complete the joint modeling according to the basic steps of vertical logistic regression, and Party B may only launch the semi-honest attacks on Party A.

Here, both labeled and unlabeled parties agree in a secure manner to use the vertical logistic regression for joint modeling, determining the size $|B|$ and composition of the batch B of each round of modeling, model parameter learning rate $\eta$, and determining align samples through secure intersection. Wherein, Party B knows the characteristics $\{(x_i)\}$ of the align samples, and Party A knows the labels $\{y_i\}$ of the align samples. Each round is initiated by Party B, responded by Party A, and ends with Party B updating the parameters of the local model $w_b^{B(t)}$. At the same time, Party A and Party B agree that after the model converges (flag=1), both parties collaboratively complete to reconstruct the true weight W of Party B.

During the model training phase, when the model has not reached the convergence conditions (at which point flag=0), the following steps are executed:

In a batch B, Party B constructs a local model $\{1_i^{B(t)}\}$ based on its own model parameters $w_b^{B(t)}$ and characteristics set $\{(x_i^{B(t)})\}$ (calculated using $1_i^{B(t)} = x_i^B w_b^{B(t)}$), and then sends $\{1_i^{B(t)}\}$ to Party A using homomorphic encryption (such as paillier algorithm).

When the model reaches the convergence conditions (at which point flag=0), both parties have completed the training of the model with erroneous labels and perform the following operations:

Party A sends the model parameter correction amounts $$\frac{y+1}{2} SS^T (SS^T)^{-1}$$

to Party B, and Party B reconstructs the real model parameter w as follows:

$$w = \frac{X^T (XX^T)^{-1} + (X^T X)^{-1} X^T \left( \frac{y+1}{2} SS^T (SS^T)^{-1} \right)}{2}$$

wherein, X corresponds to the data characteristic vector, y corresponds to the value of the real label, S is the label mapping vector obtained by batch splicing of $S_B$ and corresponds to the residual change information.

It should be noted that the residual change information mentioned above may correspond to the retention information $\neg r_i^B$ of the residuals in this batch of samples, and this retention information may be determined in the first round of training. It may be specifically implemented according to the following steps:

1) Party A orders all samples within the batch based on residuals $r_i^{B(t)}$ (from small to large or from large to small).

2) Party A performs randomized residual decomposition on the residuals of this batch of samples as follows, and randomly select a number $m \in \{2, 4\}$ as the group size composed of samples within this batch.

For the ordered sample sequence, starting from the first sample, every m samples form a group $G_i$, i=1, 2, . . . , $\lceil |B|/m \rceil$, where the symbol $\lceil |B|/m \rceil$ represents the smallest integer not less than $|B|/m$. For any formed group $G_j$, $\lceil |G_j|/2 \rceil$ samples are randomly selected from the group to form a candidate set $C^B$, and $C^B \triangleq f(B,m)$ And, for all samples in, $C^B$, the corresponding retention information $\neg r_i^B$ is determined in the following manner.

Wherein, if $r_i^{(t)} > 0$, then $\neg r_i^B = 1$; If $r_i^{B(t)} < 0$, then $\neg r_i^b = -1$, regardless of whether it is 1 or $-1$, residual change will be performed subsequently. For all samples x; that are not in $C^B$, $\neg r_i^B = 0$, residual change will not be performed subsequently. It may be specifically determined according to the following formula:

$$\neg r_i^B = \begin{cases} 1 & sort(i) \in C^{B(t)} \wedge r_i^{B(t)} > 0 \\ 0 & sort(i) \notin C^{B(t)} \\ -1 & sort(i) \in C^{B(t)} \wedge r_i^{B(t)} < 0 \end{cases}$$

wherein, sort(i) is the order of the i-th sample obtained by residual $\Delta r_i^B$ ordering in the batch. Here, in order to prevent Party B from inferring, it is possible to reorder according to the original order for the data samples by Party B.

In order to facilitate further illustration regarding the residual decomposition corresponding to the reorder operation, the residual decomposition diagram shown in FIG. 2 may be used in conjunction for further explanation.

As shown in FIG. 2, with batch size $|B|=8$, after ordering the residual values in ascending order, the bold letters in the second and fourth columns are respectively non-zero representations of samples randomly selected by group by $\neg r_i^{B(t)}$, when m=2 and m=4. The corresponding randomized residual decomposition may be seen in the 1/−1 parts of the third and fifth columns.

Here, residual change vector $S^B$ may be determined based on label retention information $\neg r_i^{B(t)}$. Each element in $S^B$ reflects whether the residual information of the sample changes during the first round of residual decomposition. When the residual changes, $S^B = -1$; otherwise $S_i^B = 1$. Namely:

$$S_i^B = \begin{cases} -1 & \neg r_i^B \neq 0 \\ 1 & \neg r_i^B = 0 \end{cases}$$

On the condition that the residual change vector $S^B$ is determined, point multiplication operation may be performed on the residual change vector and a transposition result of the residual change vector to determine a first operator $SS^T$; and, on the condition that the label values corresponding to the real labels of the respective data samples are determined, a second operator $$\frac{y+1}{2}$$

corresponding to the label value is determined, and then the model parameter correction amounts $$\left( \frac{y+1}{2} SS^T (SS^T)^{-1} \right)$$

is determined.

It should be noted that the above model parameter correction amounts may be sent by Party A to Party B after the model training is completed. During the model training process, the pseudo residual sent by Party A to Party B may be computed according to the following formula:

$$\tilde{r}_i^{B(t)} = r_i^{B(t)} - \neg r_i^B$$

In this way, Party B updates its own model parameter $w_b^{B(t)}$ in the cryptographic state, and the computation method is:

$$w_b^{B(t)} = w_b^{B(t)} - \eta g_b^{B(t)}$$

wherein, $g_b^{B(t)}$ is the gradient information about the parameter $w_b^{B(t)}$ obtained by Party B based on identity information, this information is equivalent to the pseudo gradient information $\{x_i \tilde{r}_i^{B(t)}\}$ obtained by Party A by multiplying the characteristics and corresponding pseudo residuals on each sample.

Figure 3:
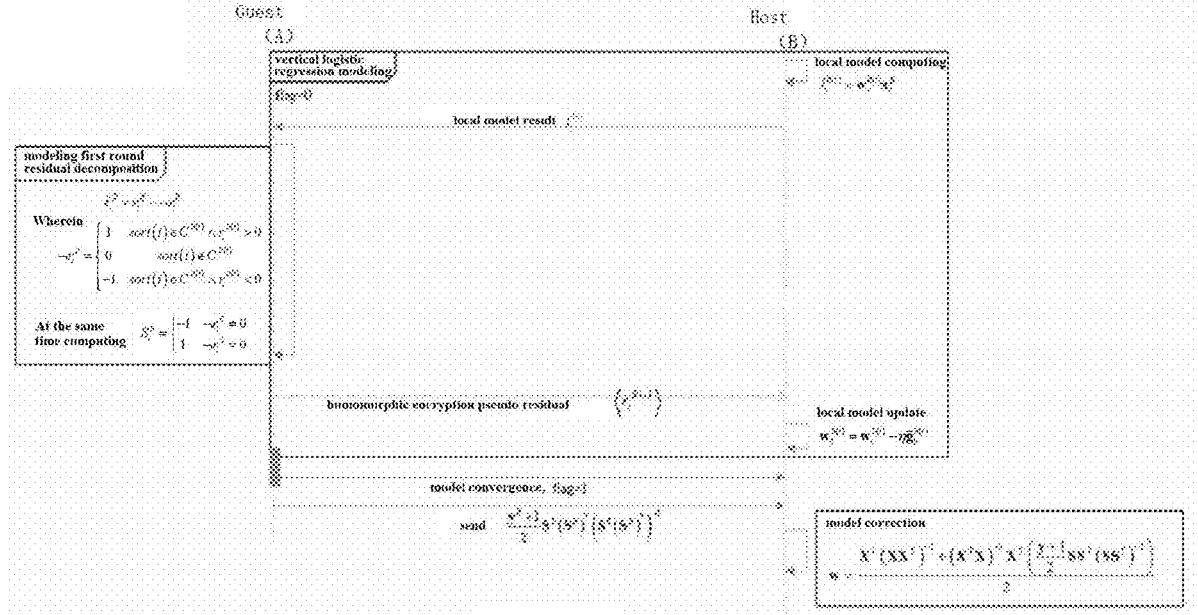
FIG. 3 shows a timing flowchart of a data processing method provided by an embodiment of the present application.

The above steps are repeated for each batch B until all samples have completed a round of parameter updates and it is then determined whether the model reaches the convergence conditions. If it reaches the convergence conditions, set flag=1, otherwise continue. The timing diagram of the main operations is shown in FIG. 3.

It is known that an embodiment of the present application performs two steps of one residual decomposition (only in the first round of joint modeling) and one model parameter reconstruction information transmission on the side of the labeled party, while one weight construction is required on the side of the unlabeled party, which may be illustrated with reference to FIG. 4.

Figure 4:
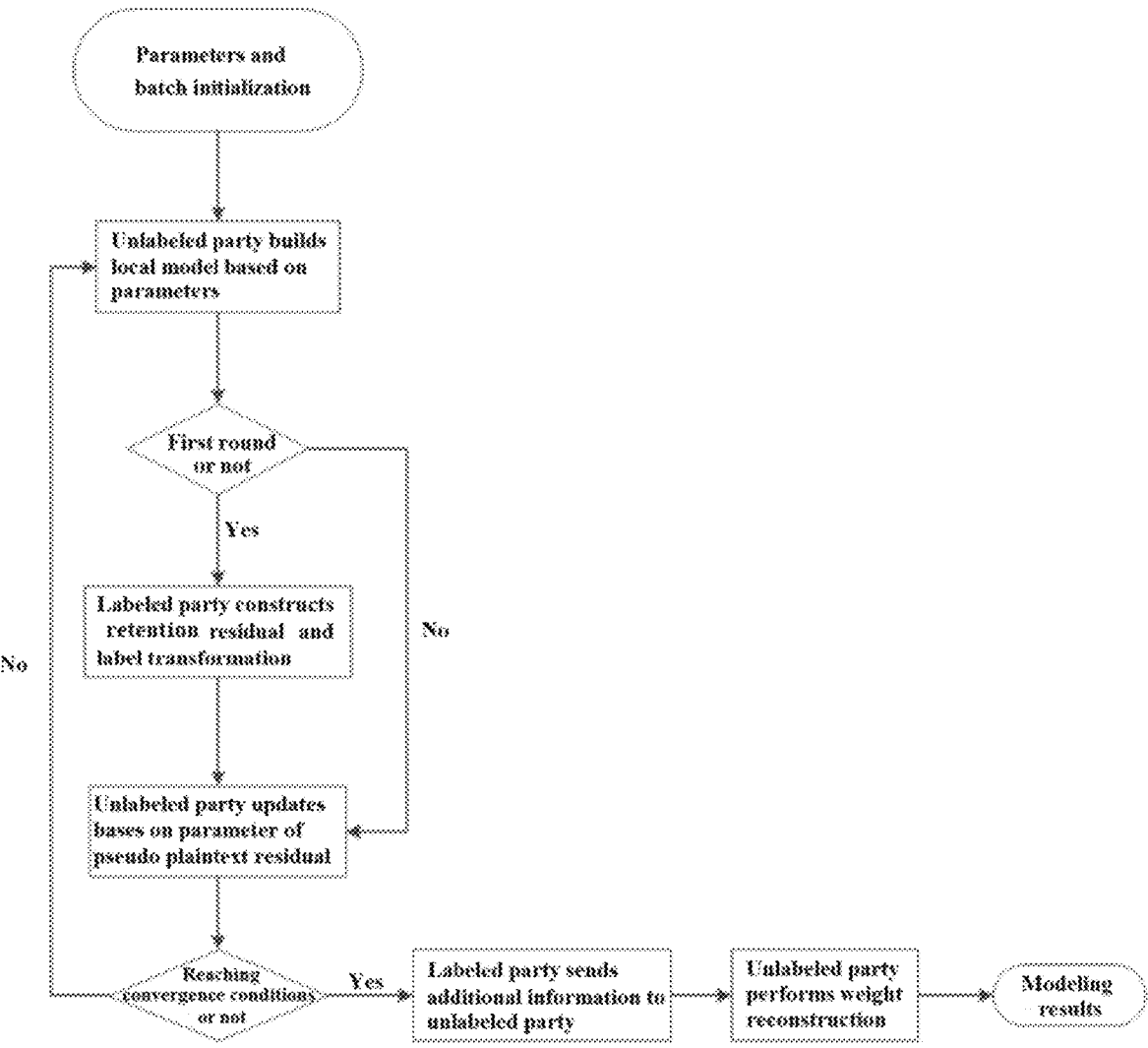
FIG. 4 shows a schematic diagram of the application of a data processing method provided by an embodiment of the present application.

As shown in FIG. 4, after completing batch initialization, the unlabeled party may build a local model based on the model parameters provided by the labeled party, and then the labeled party determines whether it is in the first round of training. If so, the labeled party may construct retention residual and label transformation according to the above steps, while the unlabeled party may update based on pseudo residuals. Then, when it is determined that the model has converged, the labeled party may send additional information to the unlabeled party to facilitate weight reconstruction by the unlabeled party.

It should be noted that the embodiments of the present application do not limit the specific implementation methods of the two modules of batch initialization and reaching convergence conditions, and do not limit the implementation methods of the alignment of samples between both parties before batch initialization. The embodiments of the present application focus on the implementation of residual decomposition for the unlabeled party by the labeled party and the collaborative implementation of weight reconstruction with unlabeled party. Other step computations in the model training phase may be solved using classical gradient descent method.

In addition, data security may be analyzed from the two parts of model training and model correction. During the model training process, residual retention information is solely owned by the labeled party and does not participate in the model training process. The unlabeled party cannot determine whether the labeled party has modified a specific example label based on known information.

For labeled party, this kind of security is at the level of information theory, with the effect of making it impossible for the unlabeled party to obtain its own labels by increasing computing power, and only one round of local operations is required to be executed. And, the additional computational cost is negligible compared to the overall joint modeling cost. Therefore, the unlabeled party cannot obtain the real label y of the labeled party based on semi-honest attacks.

For the weight reconstruction part, the theoretical basis is the equation XWS=YS. Since the real label and its transformation information $$\left(\left(\frac{y+1}{2}SS^T(SS^T)^{-1}\right)\right)$$

are sent to the unlabeled party as a whole, this process does not involve gradient information interaction and is independent of known label leakage methods. This makes it impossible for the unlabeled party to compute the label mapping S made by labeled party for the labels and the actual label Y. Therefore, if attackers continue to use known label leakage attack methods, the random correspondence between residuals and labels cannot be eliminated from beginning to end. In other words, regardless of whether the unlabeled party obtains positive or negative residual values, their corresponding real labels may be positive (1) or negative (0).

Furthermore, the usability of the model may be analyzed from the perspective of weight reconstruction. Given that the background of the problem may be limited to binary classification, if the labeled party changes the residual values of the randomly selected samples in the first round, the effect is equivalent to changing the real labels of the samples, from positive class (negative class) to negative class (positive class). The significance of ordering lies in combating the leakage of more label information of the labeled party by the unlabeled party due to differences in random initialization parameters. Therefore, there is no significant difference in information when applying S or $\{\neg r_i^{B(t)}\}$ onto the real labels Y, and the information in the final results obtained are not obfuscated, including differential privacy, before being sent by the labeled party. The weights can theoretically achieve better results in terms of their ability to differentiate between sample categories.

As shown in FIG. 5, it is a flowchart of a data processing method provided according to an embodiment of the present application. This method is mainly executed by the data receiver, which specifically includes steps S501-S502, where:

S501: Receiving model parameter correction amounts corresponding to respective data samples sent by a data sender; wherein, the model parameter correction amounts are determined by means of residual decomposition based on label residual values determined for the respective data samples, each label residual value being used for representing a degree of deviation between a real label of a corresponding data sample and a label predicted by a target model;

S502: Reconstructing model parameter information of the target model based on the model parameter correction amounts.

Here, parameter reconstruction of the target model may be achieved based on the received model parameter correction amounts. Since the model parameter correction amounts here are determined based on the real labels of the data sender and the corresponding residual change information, the corresponding label replacement situation may be marked. And, the real labels cannot be resolved based on the correction amounts. Therefore, accurate reconstruction of model parameters may be achieved on the premise of protecting the real labels of the data sender.

Wherein, the process of determining the model parameter correction amounts may refer to the relevant description of the above embodiments, and will not be repeated here.

In the process of reconstructing model parameter information, in addition to relying on the above-mentioned model parameter correction amounts, it is also necessary to consider the data characteristic information input for the target model. This may specifically be achieved through the following steps:

Step 1: Performing point multiplication operation on the data characteristic vector and a transpose result of the data characteristic vector to determine a third operator; and, performing point multiplication operation on the transpose result of the data characteristic vector and the data characteristic vector to determine a fourth operator;

Step 2: Determining the model parameter information of the target model based on the third operator, the fourth operator, and the model parameter correction amounts.

The process of determining model parameter information in an embodiment of the present application may refer to the formula for model parameter w mentioned above:

$$w = \frac{X^T(XX^T)^{-1} + (X^TX)^{-1}X^T\left(\frac{y+1}{2}SS^T(SS^T)^{-1}\right)}{2}$$

$XX^T$ here corresponds to the third operator, $X^TX$ corresponds to the fourth operator, $$\left(\frac{y+1}{2}SS^T(SS^T)^{-1}\right)$$

corresponds to the correction amounts, and then the model parameters may be determined.

In the description of the present specification, the expressions such as referring to the terms "some possible embodiments", "some embodiments", "examples", "specific examples", or "some examples" mean that the specific features, structures, materials, or characteristics described in conjunction with the embodiments or examples are included in at least one embodiment or example of the present application. In the present specification, the schematic expressions of the above terms do not necessarily refer to the same embodiments or examples. And, the specific features, structures, materials, or characteristics described may be combined in any one or more embodiments or examples in an appropriate manner. In addition, those skilled in the art may integrate and combine the different embodiments or examples described in the present specification, as well as the features of different embodiments or examples, without conflicting with each other.

Regarding the flowcharts of the methods of embodiments of the present application, some operations are described as different steps executed in a certain order. Such flowcharts are illustrative rather than restrictive. Some steps described herein may be grouped together and executed in a single operation, some steps may be divided into a plurality of sub-steps, and some steps may be executed in a different order than shown herein. The various steps shown in the flowcharts may be implemented in any way by any circuit structure and/or tangible mechanism (such as software, hardware (such as logic functions implemented by processors or chips) running on a computer device, and/or any combinations thereof).

Those skilled in the art can understand that in the above methods of specific embodiments, the describing order of the respective steps do not imply a strict execution order, which then constitutes any limitation on the implementation process. The specific execution order of the respective steps should be determined by their functions and possible internal logics.

Based on the same inventive concept, embodiments of the present application also provide data processing apparatuses corresponding to the data processing methods. As the principle of solving the problem of the apparatuses in the embodiments of the present application is similar to that of the data processing methods of the embodiments of the present application, the implementation of the apparatuses may refer to the implementation of the method, and the repetition will not be repeated.

Figure 6:
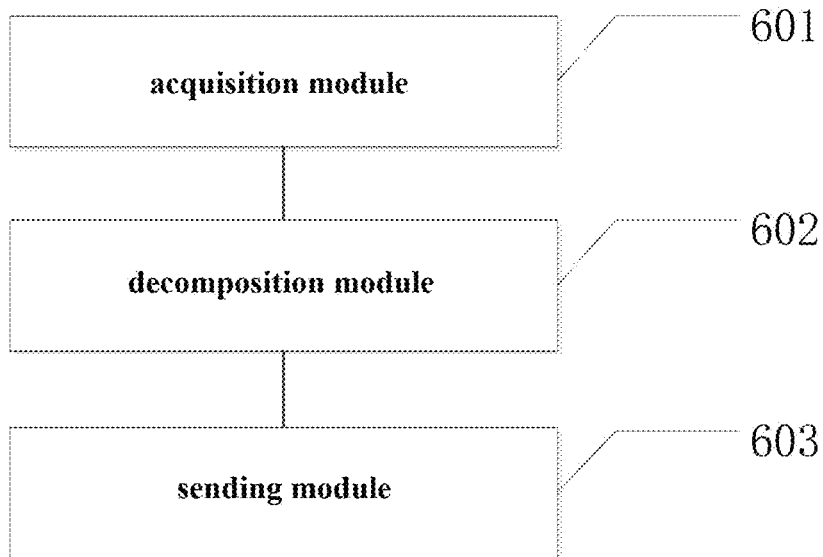
FIG. 6 shows a schematic diagram of a data processing apparatus provided by an embodiment of the present application.

Referring to FIG. 6, it is a schematic diagram of a data processing apparatus provided according to an embodiment of the present application, the apparatus comprising: an acquisition module 601, a decomposition module 602, and a sending module 603; wherein, the acquisition module 601, for acquiring label residual values determined for respective data samples, each label residual value being used for representing a degree of deviation between a real label of a corresponding data sample and a label predicted by a target model;

the decomposition module 602, for performing residual decomposition on the respective data samples based on the respective label residual values to obtain model parameter correction amounts corresponding to the respective data samples;

the sending module 603, for sending the model parameter correction amounts to a data receiver, so that the data receiver reconstructs model parameter information of the target model based on the model parameter correction amounts.

By using the above data processing apparatus, on the condition that the label residual values determined for the respective data samples are obtained, residual decomposition may be performed on the respective data samples based on the respective label residual values. Then, the model parameter correction amounts corresponding to the respective data samples obtained from residual decomposition may be sent to the data receiver, and the data receiver may reconstruct the model parameter information based on the model parameter correction amounts. In the present application, the data sender (i.e., the labeled party) can effectively perturb the residuals during the residual decomposition process, so that the data receiver (i.e., the unlabeled party) can only construct the model with erroneous label information. This enables the data sender to protect the real labels owned thereby, and at the same time, the labeled party can transmit necessary correction information (i.e., model parameter correction amounts) to the unlabeled party, allowing the unlabeled party to reconstruct accurate model parameter information based on the correction information so as to ensure the model training performance.

In a possible embodiment, the decomposition module 602 is used to perform residual decomposition on the respective data samples based on the respective label residual values according to the following steps, and obtain model parameter correction amounts corresponding to the respective data samples, which comprises: ordering the respective label residual values to obtain respective ordered label residual values; changing the ordered label residual values where the target data sample is based on the condition that a target data sample that requires residual decomposition is selected from the respective data samples, to obtain residual change information corresponding to the respective data samples; and determining model parameter correction amounts corresponding to the respective data samples based on the residual change information corresponding to the respective data samples and the real labels of the respective data samples.

In a possible embodiment, the decomposition module 602 is used to select the target data sample that requires residual decomposition from the respective data samples according to the following steps:

grouping the respective ordered label residual values according to a preset number of groups to obtain grouped label residual values;

selecting a preset number of target label residual values from each grouped label residual values; and determining a data sample corresponding to the target label residual values as the target data sample.

In a possible embodiment, on the condition that the residual change information corresponding to the respective data samples corresponds to the residual change vector, the decomposition module 602 is used to change the ordered label residual values where the target data sample is in according to the following steps to obtain the residual change information corresponding to the respective data samples:

for each of the data samples, on the condition that it is judged that the data sample is not the target data sample, determining that the data sample corresponds to a first residual change value; or, on the condition that it is judged that the data sample is the target data sample and the label residual value of the data sample is greater than zero, determining that the data sample corresponds to a second residual change value; or, on the condition that it is judged that the data sample is the target data sample and the label residual value of the data sample is less than zero, determining that the data sample corresponds to a third residual change value; and collecting residual change values respectively corresponding to the respective data samples to determine the residual change vector; wherein, the residual change vector is used to represent whether the label residual values of the respective data samples have changed.

In a possible embodiment, the decomposition module 602 is used to determine the model parameter correction amounts corresponding to the respective data samples based on the residual change information corresponding to the respective data samples and the real labels of the respective data samples according to the following steps:

performing point multiplication operation on the residual change vector and a transpose result of the residual change vector to determine a first operator; and, determining a second operator corresponding to the label values on the condition that the label values corresponding to the real labels of the respective data samples are determined; and determining the model parameter correction amounts corresponding to the respective data samples based on the first operator and the second operator.

In a possible embodiment, the sending module 603 is also used for:

determining changed label residual values based on the residual change information corresponding to the respective data samples and product operation between the respective ordered label residual values after obtaining the residual change information corresponding to the respective data samples;

determining the model parameter information to be sent to the data receiver based on the changed label residual values; and sending the model parameter information to the data receiver.

In a possible embodiment, the sending module 603 is used to send the model parameter information to the data receiver according to the following step:

sending the model parameter information to the data receiver on the condition that model convergence conditions are not reached;

the sending module 603 is used to send the model parameter correction amounts to the data receiver according to the following step:

sending the model parameter correction amounts to the data receiver on the condition that the model convergence conditions are reached.

Figure 7:
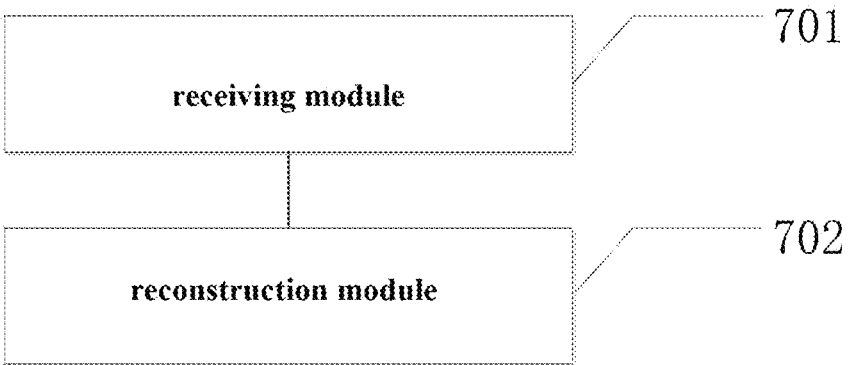
FIG. 7 shows a schematic diagram of another data processing apparatus provided by an embodiment of the present application.

Referring to FIG. 7, it is a schematic diagram of another data processing apparatus provided according to an embodiment of the present application, the apparatus comprising: a receiving module 701 and a reconstruction module 702; wherein, the receiving module 701 is used to receive model parameter correction amounts corresponding to respective data samples sent by a data sender; wherein, the model parameter correction amounts are determined by means of residual decomposition based on label residual values determined for the respective data samples, each label residual value being used for representing a degree of deviation between a real label of a corresponding data sample and a label predicted by a target model; and the reconstruction module 702 is used to reconstruct model parameter information of the target model based on the model parameter correction amounts.

In a possible embodiment, the reconstruction module 702 is used to reconstruct the model parameter information of the target model based on the model parameter correction amounts according to the following steps:

acquiring data characteristic information input for the target model; and determining the model parameter information of the target model based on the data characteristic information and the model parameter correction amounts.

In a possible embodiment, on the condition that the data characteristic information comprises a data characteristic vector, the reconstruction module 702 is used to determine the model parameter information of the target model based on the data characteristic information and the model parameter correction amounts according to the following steps:

performing point multiplication operation on the data characteristic vector and a transpose result of the data characteristic vector to determine a third operator; and, performing point multiplication operation on the transpose result of the data characteristic vector and the data characteristic vector to determine a fourth operator; and determining the model parameter information of the target model based on the third operator, the fourth operator, and the model parameter correction amounts.

It should be noted that the apparatuses in the embodiments of the present application may implement various processes of the embodiments of the aforementioned method, and achieve the same effects and functions, which will not be repeated here.

Figure 8:
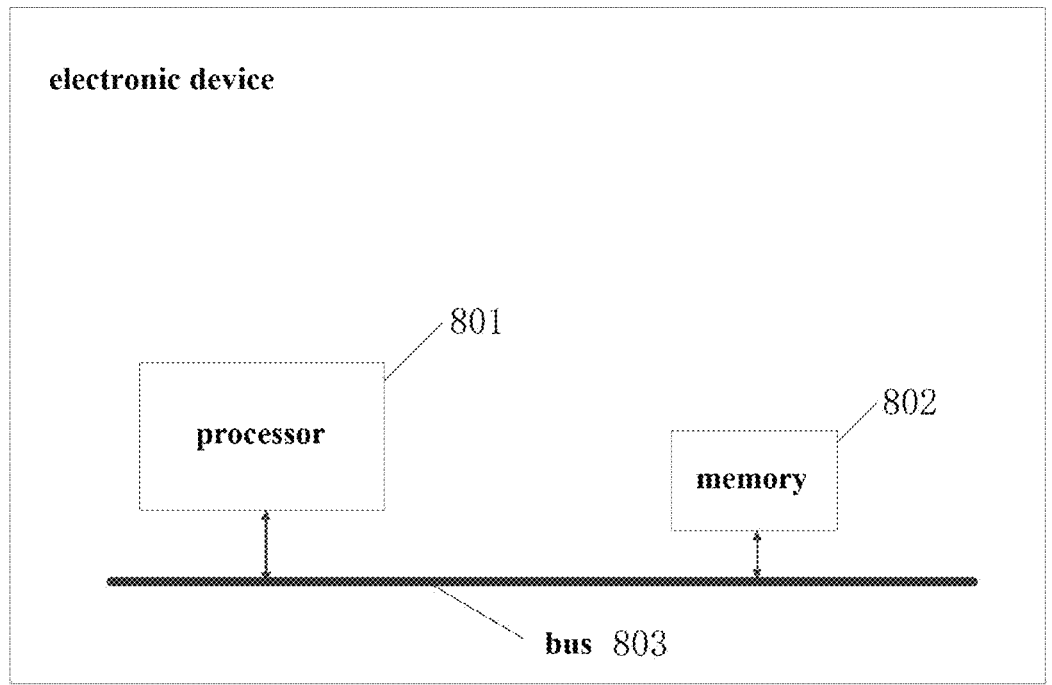
FIG. 8 shows a schematic diagram of an electronic device provided by an embodiment of the present application.

An embodiment of the present application also provides an electronic device. As shown in FIG. 8, it is a structural schematic diagram of an electronic device provided according to an embodiment of the present application, comprising: a processor 801, a memory 802, and a bus 803. The memory 802 stores machine-readable instructions executable by the processor 801 (such as the execution instructions corresponding to the acquisition module 601, decomposition module 602, and sending module 603 in the apparatus shown in FIG. 6; or such as the execution instructions corresponding to the receiving module 701 and reconstruction module 702 in the apparatus shown in FIG. 7, and so on). When the electronic device is running, the processor 801 and the memory 802 communicate with each other through the bus 803, and the machine-readable instructions are executed by the processor 801 to execute the steps of the data processing method shown in FIG. 1 or FIG. 5.

An embodiment of the present application also provides a computer-readable storage medium with a computer program stored thereon. The computer program is executed by a processor to execute the steps of the data processing method described in the above embodiments of the method. Wherein, the storage medium may be a volatile or non-volatile computer-readable storage medium.

An embodiment of the present application also provides a computer program product carrying program code, wherein the instructions included in the program code may be used to execute the steps of the data processing method described in the above embodiments of the method. Please refer to the above embodiments of the method for details, which will not be repeated here.

Wherein, the above-mentioned computer program product may be specifically implemented through hardware, software, or a combination thereof. In an optional embodiment, the computer program product is embodied as a computer storage medium, while in another optional embodiment, the computer program product is embodied as a software product, such as a Software Development Kit (SDK), and the like.

The various embodiments in the present application are described in a progressive manner. The same and similar parts between the various embodiments may be referred to each other. Each embodiment focuses on the differences from other embodiments. In particular, for the embodiments of apparatus, device, and computer-readable storage medium, as they are basically similar to those of the method, the description therefor is simplified. For relevant information, please refer to the part of description for the embodiments of the method.

The apparatus, device, and computer-readable storage medium provided in the embodiments of the present application correspond to the method on a one-on-one basis. Therefore, the apparatus, device, and computer-readable storage medium also have beneficial technical effects similar to those of the method corresponding to them. As the beneficial technical effects of the method have been described in detail above, the beneficial technical effects of the apparatus, device, and computer-readable storage medium will not be repeated here.

Those skilled in the art should understand that the embodiments of the present application may be provided as method, apparatus (device or system), or computer-readable storage medium. Therefore, the present application may take the form of a fully hardware implementation, a fully software implementation, or a combination of software and hardware implementations. In addition, the present application may take the form of computer-readable storage medium implemented on one or more computer-usable storage medium (including but not limited to disk storage, CD-ROM, optical storage, etc.) containing computer-usable program code.

The present application is described with reference to the flowcharts and/or block diagrams of the method, apparatus (device or system), and computer-readable storage medium according to the embodiments of the present application. It should be understood that each process and/or block in the flowcharts and/or block diagrams, as well as the combination(s) of processes and/or blocks in the flowcharts and/or block diagrams, may be implemented by computer program instructions. These computer program instructions may be provided to a processor of a general-purpose computer, special-purpose computer, embedded processor, or other programmable data processing apparatus to generate a machine, such that the instructions executed by the processor of the computer or other programmable data processing apparatus generate an apparatus for implementing the functions specified in one or more processes in the flowcharts and/or one or more blocks in the block diagrams.

These computer program instructions may also be stored in computer-readable memory that may guide a computer or other programmable data processing apparatus to operate in a specific manner, causing the instructions stored in the computer-readable memory to produce a manufactured product including an instruction apparatus that implements the functions specified in one or more processes in the flowcharts and/or one or more blocks in the block diagrams.

These computer program instructions may also be loaded onto a computer or other programmable data processing apparatus, enabling a series of operation steps to be executed on the computer or other programmable device to generate computer implemented processing. As a result, the instructions executed on the computer or other programmable device provide steps for implementing the functions specified in one or more processes in the flowcharts and/or one or more blocks in the block diagrams.

In a typical configuration, a computing device includes one or more processors (CPUs), input/output interfaces, network interfaces, and memory.

The memory may include non-permanent memory, random access memory (RAM) and/or non-volatile memory in computer-readable media, such as read-only memory (ROM) or flash RAM. Memory is an example of computer-readable media.

Computer-readable media including permanent and non-permanent, removable and non-removable media may be implemented by any method or technology for information storage. Information may be computer-readable instructions, data structures, modules of a program, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), digital versatile disc (DVD) or other optical storage, magnetic tape cartridges, magnetic disk storage or other magnetic storage devices, or any other non-transmitting medium that may be used to store information that may be accessed by computing devices. In addition, although the operations of the method of the present application are described in a specific order in the accompanying drawings, this does not require or imply that these operations need be performed in that specific order, or that all shown operations need be performed so as to achieve the desired results. Additionally or alternatively, certain steps may be omitted, multiple steps may be merged into one step for execution, and/or one step may be decomposed into multiple steps for execution.

Although the spirit and principle of the present application have been described with reference to several specific embodiments, it should be understood that the present application is not limited to the specific embodiments disclosed herein. The division of various aspects does not mean that the features in these aspects cannot be combined for benefit. This division is only for the convenience of expression. The present application is intended to cover various modifications and equivalent arrangements included within the spirit and scope of the appended claims.

The invention claimed is:

1. A data processing method, comprising:

acquiring label residual values determined for respective data samples, each label residual value being used for representing a degree of deviation between a real label of a corresponding data sample and a label predicted by a target model;

performing residual decomposition on the respective data samples based on respective label residual values to obtain model parameter correction amounts corresponding to the respective data samples, the residual decomposition comprising locally perturbing the label residual values at a data sender to generate model parameter correction amounts that preserve model accuracy; and sending the model parameter correction amounts to a data receiver, so that the data receiver reconstructs model parameter information of the target model based on the model parameter correction amounts;

wherein, performing residual decomposition on the respective data samples based on respective label residual values to obtain model parameter correction amounts corresponding to the respective data samples, comprises:

ordering the respective label residual values in an order of data size to obtain respective ordered label residual values;

changing the ordered label residual values where the target data sample is based on the condition that a target data sample that requires residual decomposition is selected from the respective data samples, to obtain residual change information in the form of a residual change vector corresponding to the respective data samples; and determining model parameter correction amounts corresponding to the respective data samples based on the residual change information corresponding to the respective data samples and the real labels of the respective data samples.

2. The method according to claim 1, wherein, the target data sample that requires residual decomposition is selected from the respective data samples according to following steps:

grouping the respective ordered label residual values according to a preset number of groups to obtain grouped label residual values;

selecting a preset number of target label residual values from each grouped label residual values; and determining a data sample corresponding to the target label residual values as the target data sample.

3. The method according to claim 1, wherein, changing the ordered label residual values where the target data sample is based on the condition that the residual change information corresponding to the respective data samples corresponds to a residual change vector, to obtain the residual change information corresponding to the respective data samples, comprises:

for each of the data samples, on the condition that it is judged that the data sample is not the target data sample, determining that the data sample corresponds to a first residual change value; or, on the condition that it is judged that the data sample is the target data sample and the label residual value of the data sample is greater than zero, determining that the data sample corresponds to a second residual change value; or, on the condition that it is judged that the data sample is the target data sample and the label residual value of the data sample is less than zero, determining that the data sample corresponds to a third residual change value; and collecting residual change values respectively corresponding to the respective data samples to determine the residual change vector; wherein, the residual change vector is used to represent whether the label residual values of the respective data samples have changed.

4. The method according to claim 2, wherein, determining model parameter correction amounts corresponding to the respective data samples based on the residual change information corresponding to the respective data samples and the real labels of the respective data samples, comprises:

performing point multiplication operation on the residual change vector and a transpose result of the residual change vector to determine a first operator; and, determining a second operator corresponding to the label values on the condition that the label values corresponding to the real labels of the respective data samples are determined; and determining the model parameter correction amounts corresponding to the respective data samples based on the first operator and the second operator.

5. The method according to claim 1, wherein, after obtaining the residual change information corresponding to the respective data samples, the method further comprises:

determining changed label residual values based on the residual change information corresponding to the respective data samples and product operation between the respective ordered label residual values;

determining the model parameter information to be sent to the data receiver based on the changed label residual values; and sending the model parameter information to the data receiver.

6. The method according to claim 4, wherein, sending the model parameter information to the data receiver comprises:

sending the model parameter information to the data receiver on the condition that model convergence conditions are not reached, sending the model parameter correction amounts to the data receiver comprises:

sending the model parameter correction amounts to the data receiver on the condition that the model convergence conditions are reached.

* * * * *